(12) United States Patent
Anderson et al.

(10) Patent No.: US 12,447,605 B2
(45) Date of Patent: Oct. 21, 2025

(54) SYSTEMS AND METHODS FOR OBJECT PROCESSING WITH PROGRAMMABLE MOTION DEVICES USING YAWING GRIPPERS

(71) Applicant: Berkshire Grey Operating Company, Inc., Bedford, MA (US)

(72) Inventors: Bretton Anderson, Westford, MA (US); Jason Yap, Newton, MA (US); William Chu-Hyon McMahan, North Cambridge, MA (US); Calvin Toothaker, Melrose, MA (US); William Farmer, Bolton, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 120 days.

(21) Appl. No.: 18/099,420

(22) Filed: Jan. 20, 2023

(65) Prior Publication Data

US 2023/0234216 A1 Jul. 27, 2023

Related U.S. Application Data

(60) Provisional application No. 63/314,546, filed on Feb. 28, 2022, provisional application No. 63/301,630, filed on Jan. 21, 2022.

(51) Int. Cl.
*B25J 15/06* (2006.01)
*B25J 9/00* (2006.01)
(Continued)

(52) U.S. Cl.
CPC ............ *B25J 9/0009* (2013.01); *B25J 9/0093* (2013.01); *B25J 9/102* (2013.01); *B25J 15/0616* (2013.01); *B25J 17/00* (2013.01)

(58) Field of Classification Search
CPC ........ B25J 18/025; B25J 9/0009; B25J 9/102; B25J 15/0616
See application file for complete search history.

(56) References Cited

U.S. PATENT DOCUMENTS

| 2,853,333 A | 9/1958 | Littell |
| 3,005,652 A | 10/1961 | Helm |
(Continued)

FOREIGN PATENT DOCUMENTS

| CH | 701886 A2 | 3/2011 |
| CN | 118574708 A | 8/2024 |
(Continued)

OTHER PUBLICATIONS

Notification of Transmittal of the International Search Report and the Written Opinion of the International Searching Authority and with the International Search Report and Written Opinion issued by the European Patent Office, as the International Searching Authority, in related International Application No. PCT/US2023/011222 on May 16, 2023, 17 pages.
(Continued)

*Primary Examiner* — Randell J Krug
(74) *Attorney, Agent, or Firm* — Gesmer Updegrove LLP

(57) ABSTRACT

An end-effector system is disclosed for use with a programmable motion device. The end-effector system includes an arm attachment portion for attachment to an arm of the programmable motion device, an end-effector attachment portion for attachment to an end-effector for grasping objects, a rotational shaft portion for rotational attachment to the arm attachment portion, said rotational shaft portion being coupled to the end-effector attachment portion at a distal end thereof, and a motor system providing rotation of
(Continued)

the rotational shaft portion as well as the end-effector attachment portion with respect to the arm attachment portion.

35 Claims, 18 Drawing Sheets

(51) Int. Cl.
*B25J 9/10* (2006.01)
*B25J 17/00* (2006.01)

(56) References Cited

U.S. PATENT DOCUMENTS

| | | |
|---|---|---|
| 3,195,941 A | 7/1965 | Morey |
| 3,637,249 A | 1/1972 | Kuhl et al. |
| 4,379,363 A | 4/1983 | Whitney |
| 4,389,064 A | 6/1983 | Laverriere |
| 4,557,659 A | 12/1985 | Scaglia |
| 4,561,686 A | 12/1985 | Atchley |
| 4,609,325 A | 9/1986 | Gabrielli |
| 4,635,985 A | 1/1987 | Rooke |
| 4,653,793 A | 3/1987 | Guinot et al. |
| 4,786,847 A | 11/1988 | Daggett et al. |
| 4,828,304 A | 5/1989 | No et al. |
| 4,846,619 A | 7/1989 | Crabtree et al. |
| 4,850,627 A | 7/1989 | Franklin |
| 5,017,084 A | 5/1991 | Lemelson |
| 5,024,575 A | 6/1991 | Anderson |
| 5,207,465 A | 5/1993 | Rich |
| 5,244,338 A | 9/1993 | White |
| 5,752,729 A | 5/1998 | Crozier et al. |
| 5,777,267 A | 7/1998 | Szydel |
| 5,791,861 A | 8/1998 | Seelig |
| 5,865,487 A | 2/1999 | Gore et al. |
| 5,909,941 A | 6/1999 | Cheng et al. |
| 6,015,174 A | 1/2000 | Raes et al. |
| 6,244,640 B1 | 6/2001 | Le Bricquer et al. |
| 6,454,333 B2 | 9/2002 | Portal |
| 6,579,053 B1 | 6/2003 | Grams et al. |
| 6,817,639 B2 | 11/2004 | Schmalz et al. |
| 7,017,961 B1 | 3/2006 | Parnell et al. |
| 7,263,890 B2 | 9/2007 | Takahashi |
| 7,311,489 B2 | 12/2007 | Ekman |
| 7,313,464 B1 | 12/2007 | Perreault et al. |
| 7,474,939 B2 | 1/2009 | Oda et al. |
| 7,618,074 B2 | 11/2009 | Zimmer |
| 7,677,622 B2 | 3/2010 | Dunkmann et al. |
| 8,070,203 B2 | 12/2011 | Schaumberger |
| 8,132,835 B2 | 3/2012 | Ban et al. |
| 8,146,971 B2 | 4/2012 | LaValley et al. |
| 8,267,386 B2 | 9/2012 | Schaaf et al. |
| 8,714,903 B2 | 5/2014 | Feng |
| 8,777,284 B2 | 7/2014 | Schaller et al. |
| 9,227,323 B1 | 1/2016 | Konolige et al. |
| 9,266,237 B2 | 2/2016 | Nomura |
| 9,283,680 B2 | 3/2016 | Yasuda et al. |
| 9,346,172 B2 | 5/2016 | Mihara et al. |
| 9,415,975 B2 | 8/2016 | Lundin |
| 9,486,926 B2 | 11/2016 | Kawano |
| 9,492,923 B2 | 11/2016 | Wellman et al. |
| 9,604,363 B2 | 3/2017 | Ban |
| 9,623,570 B1 | 4/2017 | Krahn et al. |
| 9,656,813 B2 | 5/2017 | Dunkmann et al. |
| 9,687,982 B1 | 6/2017 | Jules et al. |
| 9,981,379 B1 | 5/2018 | Youmans et al. |
| 9,999,977 B2 | 6/2018 | Wagner et al. |
| 10,007,827 B2 | 6/2018 | Wagner et al. |
| 10,058,896 B2 | 8/2018 | Hicham et al. |
| 10,118,300 B2 | 11/2018 | Wagner et al. |
| 10,335,956 B2 | 7/2019 | Wagner et al. |
| 10,639,787 B2 | 5/2020 | Wagner et al. |
| 11,203,115 B2 | 12/2021 | Wagner et al. |
| 11,839,974 B2 | 12/2023 | Wagner et al. |
| 2001/0045755 A1 | 11/2001 | Schick et al. |
| 2001/0056313 A1 | 12/2001 | Osborne, Jr. |
| 2003/0038491 A1 | 2/2003 | Schmalz et al. |
| 2003/0164620 A1 | 9/2003 | Schmalz et al. |
| 2007/0163377 A1 | 7/2007 | Miyazawa |
| 2008/0181485 A1 | 7/2008 | Beis et al. |
| 2009/0019818 A1 | 1/2009 | Gilmore et al. |
| 2010/0040450 A1 | 2/2010 | Parnell |
| 2010/0078953 A1 | 4/2010 | Ban et al. |
| 2010/0094461 A1 | 4/2010 | Roth et al. |
| 2010/0101346 A1 | 4/2010 | Johnson et al. |
| 2010/0109360 A1 | 5/2010 | Meisho |
| 2010/0125361 A1 | 5/2010 | Mougin et al. |
| 2010/0175487 A1 | 7/2010 | Sato |
| 2010/0180711 A1 | 7/2010 | Kilibarda et al. |
| 2011/0176148 A1 | 7/2011 | Briggs et al. |
| 2013/0110280 A1 | 5/2013 | Folk |
| 2013/0129464 A1 | 5/2013 | Regan et al. |
| 2013/0166061 A1 | 6/2013 | Yamamoto |
| 2013/0218335 A1 | 8/2013 | Barajas et al. |
| 2013/0232918 A1 | 9/2013 | Lomerson, Jr. |
| 2013/0232919 A1 | 9/2013 | Jaconelli |
| 2013/0245824 A1 | 9/2013 | Barajas et al. |
| 2013/0343640 A1 | 12/2013 | Buehler et al. |
| 2013/0345872 A1 | 12/2013 | Brooks et al. |
| 2014/0005831 A1 | 1/2014 | Naderer et al. |
| 2014/0067121 A1 | 3/2014 | Brooks et al. |
| 2014/0067127 A1 | 3/2014 | Gotou |
| 2014/0105719 A1 | 4/2014 | Mueller et al. |
| 2014/0154036 A1 | 6/2014 | Mattern et al. |
| 2014/0305847 A1 | 10/2014 | Kudrus |
| 2014/0367962 A1 | 12/2014 | Girtman |
| 2015/0081090 A1 | 3/2015 | Dong |
| 2015/0190925 A1 | 7/2015 | Hoffman et al. |
| 2015/0203340 A1 | 7/2015 | Jacobsen et al. |
| 2015/0224650 A1 | 8/2015 | Xu et al. |
| 2015/0298316 A1 | 10/2015 | Accou et al. |
| 2015/0306770 A1 | 10/2015 | Mittal et al. |
| 2015/0328779 A1 | 11/2015 | Bowman et al. |
| 2015/0375401 A1 | 12/2015 | Dunkmann et al. |
| 2016/0101526 A1 | 4/2016 | Saito et al. |
| 2016/0221187 A1 | 8/2016 | Bradski et al. |
| 2016/0243704 A1 | 8/2016 | Vakanski et al. |
| 2016/0271805 A1 | 9/2016 | Kuolt et al. |
| 2017/0021499 A1 | 1/2017 | Wellman et al. |
| 2017/0036354 A1 | 2/2017 | Chavan Dafle et al. |
| 2017/0050315 A1 | 2/2017 | Henry et al. |
| 2017/0057091 A1 | 3/2017 | Wagner et al. |
| 2017/0080571 A1 | 3/2017 | Wagner et al. |
| 2017/0080579 A1 | 3/2017 | Wagner et al. |
| 2017/0087718 A1 | 3/2017 | Wagner et al. |
| 2017/0087731 A1 | 3/2017 | Wagner et al. |
| 2017/0106532 A1 | 4/2017 | Wellman et al. |
| 2017/0120455 A1 | 5/2017 | Wagner et al. |
| 2017/0121113 A1 | 5/2017 | Wagner et al. |
| 2017/0136632 A1 | 5/2017 | Wagner et al. |
| 2017/0157648 A1 | 6/2017 | Wagner et al. |
| 2017/0197316 A1 | 7/2017 | Wagner et al. |
| 2017/0225330 A1 | 8/2017 | Wagner et al. |
| 2017/0305694 A1 | 10/2017 | McMurrough et al. |
| 2017/0322561 A1 | 11/2017 | Stiernagle |
| 2018/0117773 A1 | 5/2018 | Odhner et al. |
| 2018/0127219 A1 | 5/2018 | Wagner et al. |
| 2018/0148272 A1 | 5/2018 | Wagner et al. |
| 2018/0250811 A1 | 9/2018 | Wagner et al. |
| 2018/0281202 A1 | 10/2018 | Brudniok et al. |
| 2019/0001505 A1 | 1/2019 | Wagner et al. |
| 2019/0032826 A1 | 1/2019 | Girtman |
| 2020/0016746 A1 | 1/2020 | Yap et al. |
| 2020/0215684 A1 | 7/2020 | Wagner et al. |
| 2021/0197405 A1 | 7/2021 | Chen et al. |
| 2022/0040849 A1 | 2/2022 | Wagner et al. |
| 2022/0331956 A1 | 10/2022 | Lovett et al. |
| 2022/0395987 A1 | 12/2022 | Hvass et al. |

(56) References Cited

U.S. PATENT DOCUMENTS

2023/0089400 A1   3/2023  Jeremiah
2024/0109185 A1   4/2024  Wagner et al.

FOREIGN PATENT DOCUMENTS

| | | |
|---|---|---|
| DE | 3810989 A1 | 8/1989 |
| DE | 10121344 A1 | 11/2002 |
| EP | 0078113 A2 * | 4/1983 |
| EP | 1256421 B1 | 8/2005 |
| EP | 2708335 A1 | 3/2014 |
| EP | 2960024 B1 | 12/2020 |
| JP | 2010201536 A | 9/2010 |
| WO | 2017025076 A1 | 2/2017 |
| WO | 2017036812 A1 | 3/2017 |
| WO | 2023141260 A1 | 7/2023 |

OTHER PUBLICATIONS

Notification Concerning Transmittal of International Preliminary Report on Patentability (Chapter 1 of the Patent Cooperation Treaty) and the International Preliminary Report on Patentability issued by the International Bureau of WIPO in related international application No. PCT/US2023/011222 on Aug. 2, 2024, 11 pages.

Communication pursuant to Rules 161(1) and 162 EPC issued by the European Patent Office in related European Patent Application No. 23706175.9 on Aug. 28, 2024, 3 pages.

* cited by examiner

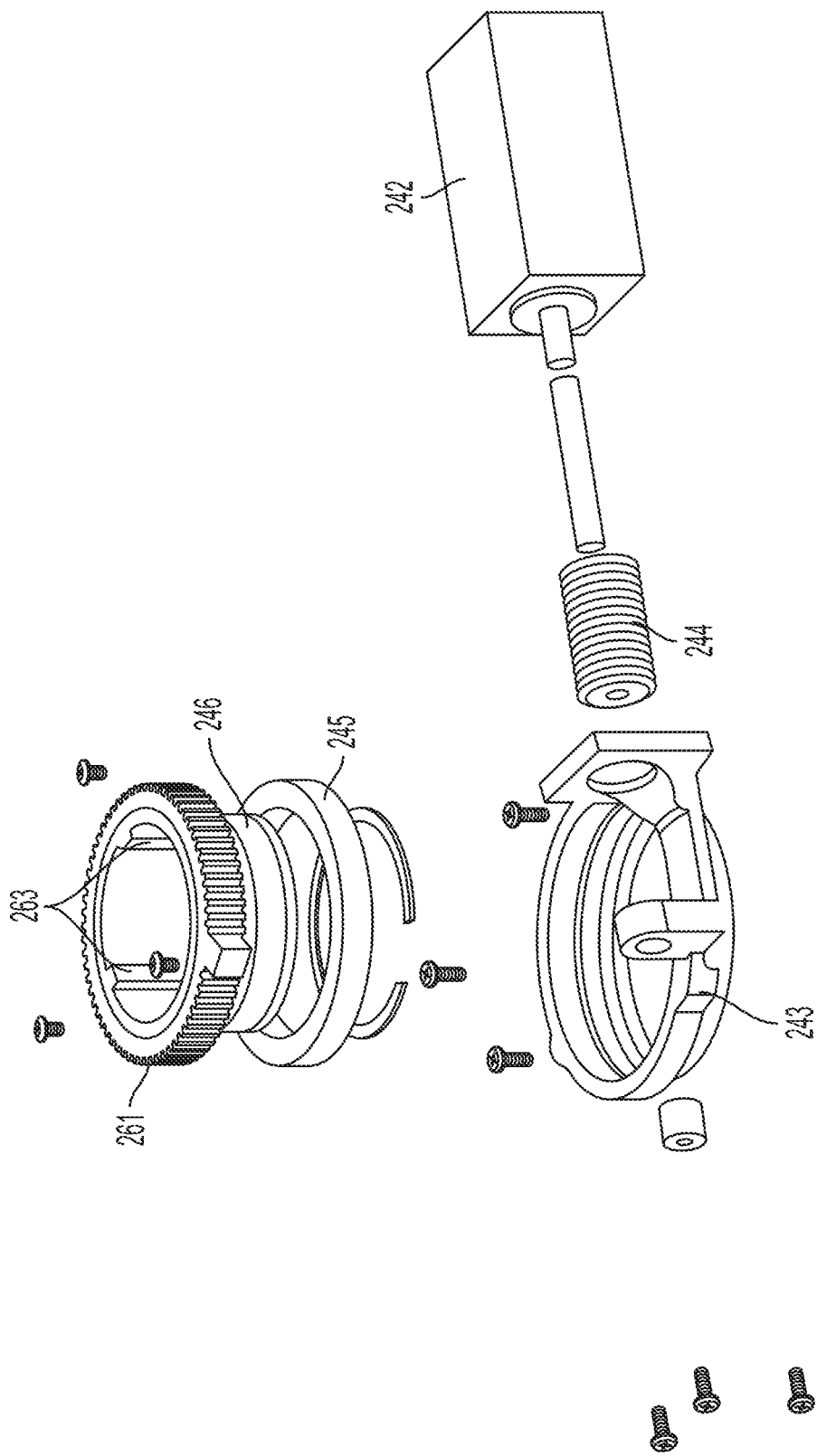

SYSTEMS AND METHODS FOR OBJECT PROCESSING WITH PROGRAMMABLE MOTION DEVICES USING YAWING GRIPPERS

PRIORITY

The present application claims priority to U.S. Provisional Patent Application No. 63/301,630, filed Jan. 21, 2022, and U.S. Provisional Patent Application Ser. No. 63/314,546, filed Feb. 28, 2022, the disclosures of which are hereby incorporated by reference in their entireties.

BACKGROUND

The invention generally relates to programmable motion systems and relates in particular to end-effectors for programmable motion devices (e.g., robotic systems) for use in object processing systems such as object sortation systems.

End-effectors for robotic systems may be employed, for example, in certain applications to select and grasp an object, and then move the acquired object very quickly to a new location. End-effectors should be designed to quickly and easily select and grasp an object from a jumble of dissimilar objects, and should be designed to securely grasp an object during movement. Certain end-effectors, when used on different objects of different physical sizes, weights and materials, may have limitations regarding how securely they may grasp an acquired object, and how securely they may maintain the grasp on the object during rapid movement, particularly rapid acceleration and deceleration (both angular and linear). Further, in certain applications it may be desired to place an object at a destination in a required orientation or pose, particularly with respect to an environment such as a container being packed by a robotic system.

Many end-effectors employ vacuum pressure for acquiring and securing objects for transport and/or subsequent operations by articulated arms. Other techniques for acquiring and securing objects involve electrostatic attraction, magnetic attraction, needles for penetrating objects such as fabrics, fingers that squeeze an object, hooks that engage and lift a protruding feature of an object, and collets that expand in an opening of an object, among other techniques.

In applications where vacuum pressure is used to acquire and secure objects, an end-effector on an articulated arm may include a vacuum cup having a compliant portion, e.g., a bellows portion that contacts the object to be grasped. The compliant portion may be formed of a polymeric or elastomeric material that is flexible enough to allow it to change its shape to adapt to variations in object surface structures, and to varying physical relationships between the articulated arm and the object, such as for example varying angles of approaches to objects. The flexibility further allows the vacuum cup to conform to the shape of objects or to wrap around corners of objects to create an adequate seal for acquiring and securing the object. When a good seal is not created between a flexible vacuum cup and an object, the system may not be able to achieve the required vacuum level or sometimes it may create a substantial amount of noise due to positioning of the vacuum cup on the object.

Other types of end-effectors including vacuum cups with less flexible compliant portions (in addition to those using electrostatic attraction, magnetic attraction, needles for penetrating objects such as fabrics, fingers that squeeze an object, hooks that engage and lift a protruding feature of an object, and collets that expand in an opening of an object), are less effective at acquiring and moving a wide variety of objects.

Vacuum end-effectors, however, may be limited in their ability to place objects in a desired orientation or pose such as in packing objects into a box or container. For example, a packing manifest may require that certain objects be placed in a specific orientation or pose, and/or the available space for packing within a container may be limited by small packing margins with respect to objects. In certain applications, accounting for a desired placement pose or orientation (e.g., in a container) may increase demands on trajectory planning and motion requirements of a programmable motion device (e.g., a robotic system) including a vacuum end-effector. Such increased demands may increase the time required for placement, which may decrease throughput of the object processing system.

Such applications in which a robotic system needs to accurately place objects relative to an environment include, for example, packing multi-unit e-commerce orders into a container, packing a single unit into an automated bagging system, packing or consolidating containers used in an automated storage and retrieval system (AS/RS), and scanning objects in front of scanners such as barcode scanners or RFID scanners. More efficient management of object pose and orientation may also increase an object processing system's ability to manage a larger number of diverse objects.

There remains a need therefore, for systems and methods for more efficiently and effectively packing and manipulating objects by efficiently adjusting placement pose or orientation of objects without adversely impacting throughput.

SUMMARY

In accordance with an aspect, the invention provides an end-effector system for use with a programmable motion device. The end-effector system includes an arm attachment portion for attachment to an arm of the programmable motion device, an end-effector attachment portion for attachment to an end-effector for grasping objects, a rotational shaft portion for rotational attachment to the arm attachment portion, said rotational shaft portion being coupled to the end-effector attachment portion at a distal end thereof, and a motor system providing rotation of the rotational shaft portion as well as the end-effector attachment portion with respect to the arm attachment portion.

In accordance with another aspect the invention provides an end-effector system for use with a programmable motion device. The end-effector system includes an arm attachment portion for attachment to an arm of the programmable motion device, said arm attachment portion extending in an axial direction and including a spline gear with inwardly facing drive splines. The end-effector system also includes an end-effector attachment portion for attachment to an end-effector for grasping objects, and a spline shaft portion received by the arm attachment portion, said spline shaft portion being coupled to the end-effector attachment portion at a distal end thereof, and including shaft splines that engage the drive splines of the spline gear to permit movement of the spline shaft with respect to the arm attachment portion in the axial direction.

In accordance with another aspect, the invention provides an end-effector system for use with a programmable motion device. The end-effector system includes an arm attachment portion for attachment to an arm of the programmable motion device, an end-effector attachment portion for attachment to an end-effector for grasping objects, and a rotational shaft portion for attachment to the arm attachment portion and the end-effector portion at a distal end thereof, said rotational shaft portion being rotatable with respect to the arm attachment portion and being axially movable with respect to the arm attachment portion.

In accordance with a further aspect, the invention provides a method of operating a programmable motion device including an end-effector. The method includes approaching an object to be grasped along a first direction with a distal end of the end-effector, grasping the object with the distal end of the end-effector, and rotating the distal end of the end-effector with the object about a first axis that is substantially parallel with the first direction.

BRIEF DESCRIPTION OF THE DRAWINGS

The following description may be further understood with reference to the accompanying drawings in which:

FIG. 19 shows an illustrative diagrammatic exploded view of the system of FIG. 18A;

Figure 1:
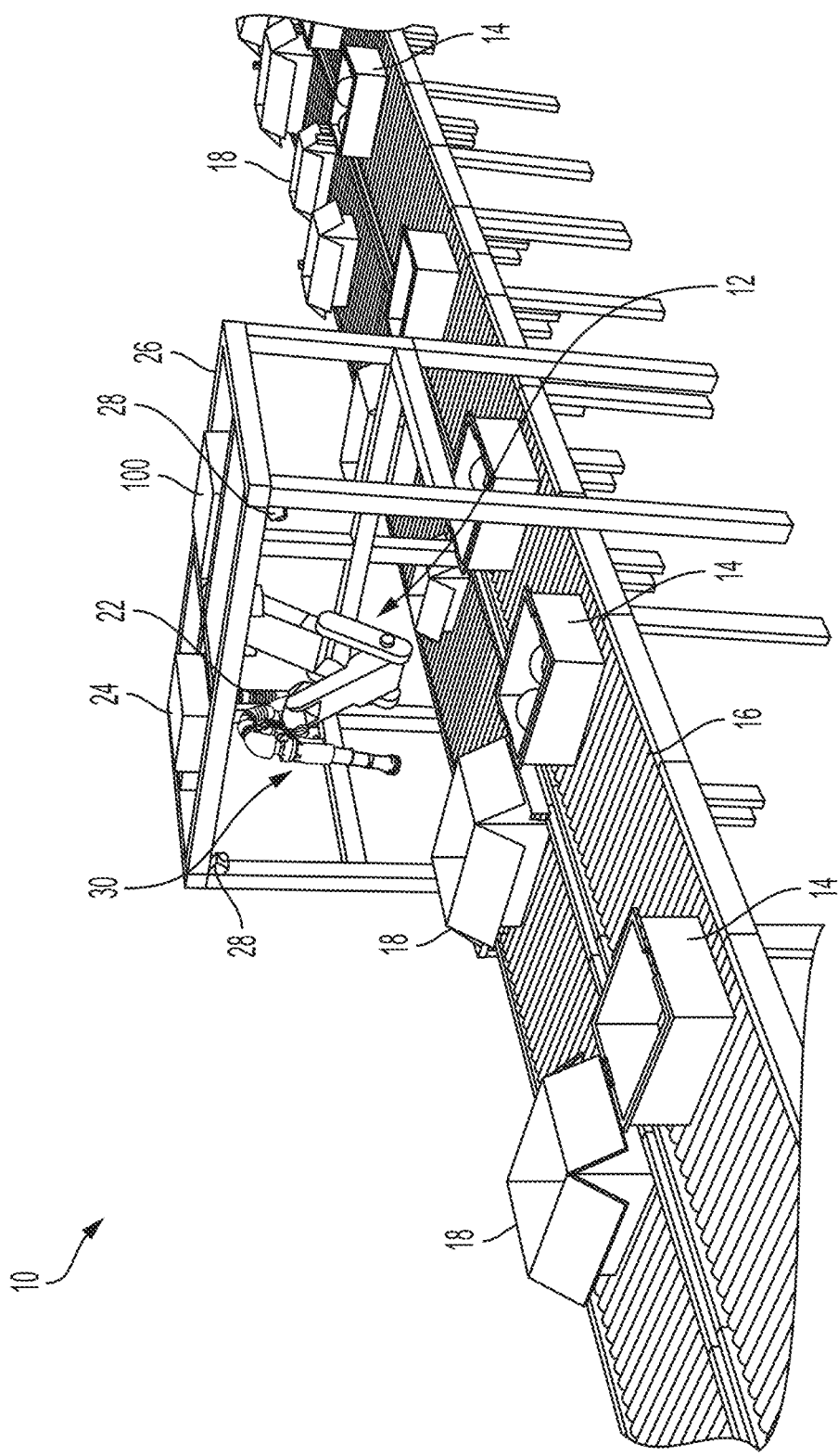
FIG. 1 shows an illustrative diagrammatic view of an object processing system including a programmable motion device with an end-effector system in accordance with an aspect of the present invention.

The drawings are shown for illustrative purposes only.

DETAILED DESCRIPTION

In accordance with various aspects, the invention provides an end-effector system for programmable motion devices (e.g., robotic systems) that provides high flow vacuum to grasp objects. The high flow vacuum is provided at a vacuum cup as the end-effector of the end-effector system that is coupled to a high flow vacuum system. The vacuum cup is attached to a cup attachment portion, which is in turn attached to an arm attachment portion that is attached to an articulated arm of the robotic system.

Manipulating the position and orientation of the end-effector requires movement of different joints (sometimes many of the joints) of the articulated arm. While a rigid object has six degrees of freedom (X, Y, Z, yaw, pitch, roll), each joint of an articulated arm generally has one degree of freedom. Through a combination of changing multiple joints, robotic systems may change the position and orientation of an end-effector. To move an end-effector from one position or even orientation to another, typically involves a more complex set of movements of a plurality of joints rather than simply moving one joint. Each joint however, typically has a limited range (and single dimension) of movement (such as for example, an elbow joint). In view of this, sometimes during use, a desired position/orientation of an end-effector and a current position/orientation of the end-effector are not connected by any viable path. In other words, all paths in, for example, 6 degrees of freedom are blocked. Also, sometimes a viable path may involve significant movement of a very heavy portion of the articulated arm, slowing throughput with time loss and energy consumption.

Path blockages may result from portions of the articulated arm itself, from structure(s) in the environment (such as support structure), and may result from the use of high flow vacuum sources, which require large diameter hoses that may not closely follow the sections and joints of the articulated arm. The high flow vacuum source may, for example, provide at the vacuum cup of an air-flow of at least about 100 cubic feet per minute, and a vacuum pressure at the vacuum cup of no more than about 100,000 Pascals below atmospheric, or no more than about 85,000 Pascals below atmospheric or no more than about 65,000 Pascals below atmospheric. The use of the large diameter hose generally requires that the vacuum cup be mounted in an offset position with respect to an end of the articulated arm to minimize binding of the hose. This unfortunately also has a significant impact on limiting movements of the end effector. For yawing motions, for example, where it may be desired to rotate an object about a z-axis (while grasping an object from above), a gripper may not hold an object in a way that rotation of the last joint would yaw the gripper. Additionally, in certain applications it is further desired to be able to determine a pose of a grasped object, requiring the presence of any of sensors and scanners to view the object and communicate with a processing system, where software may prescribe a desired re-orientation and path for the object.

In accordance with various aspects, the invention provides an end-effector system with a mechanical apparatus that rotates (e.g., about 60 degrees/second to about 100 degrees/second, such as about 70 degrees/second or about 90 degrees/second) a vacuum cup gripper without impeding the seal of the vacuum chamber, has enough torque to rotate a mass (e.g., less than 10 lbs-3 lbs, such as less than 7 lbs or less than 5 lbs) of a held object, and may rotate +/−90 degrees from a home position. In accordance with different aspects as discussed below, the end-effector system may include a worm gear drive system or a belt-driven rotation system to rotate a shaft in the end-effector system. The rotation system is not required to be synchronized with the movement of the other joints of the robotic system, is robust in design, and includes a precise rotational zero position that is easily found.

FIG. 1, for example, shows an object processing system 10 that includes a programmable motion device 12 for moving objects form input bins 14 on an input conveyor 16 to output containers 18 (e.g., boxes) on an output conveyor 20. The programmable motion device 12 includes an end-effector system 30 that is coupled to a vacuum source 24 via a vacuum hose 22. Operation of the system, including the programmable motion device, the end-effector system 30, the perception units 28, and the conveyors 16, 20, is controlled by one or more computer processing systems 100. The vacuum source 24, computer processing system(s) 100 and programmable motion device 12 may be mounted on a support structure 26 that also includes the perception units 28 for aiding in the processing of objects and movement of the programmable motion device, including the end-effector system 30.

Figure 2A:
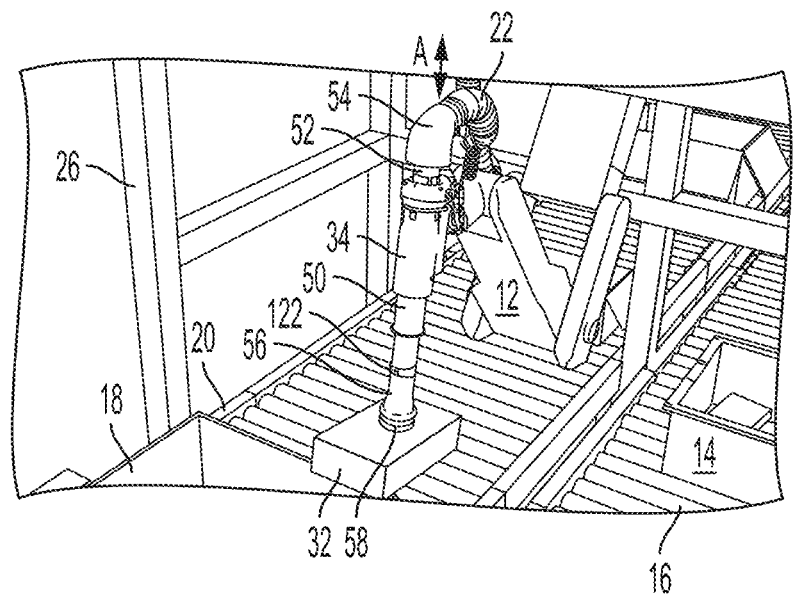
FIGS. 2A-2B show illustrative diagrammatic views of the end-effector system of FIG. 1 showing the end-effector system grasping an object (FIG. 2A) and then rotated while grasping the object (FIG. 2B)
Figure 2B:
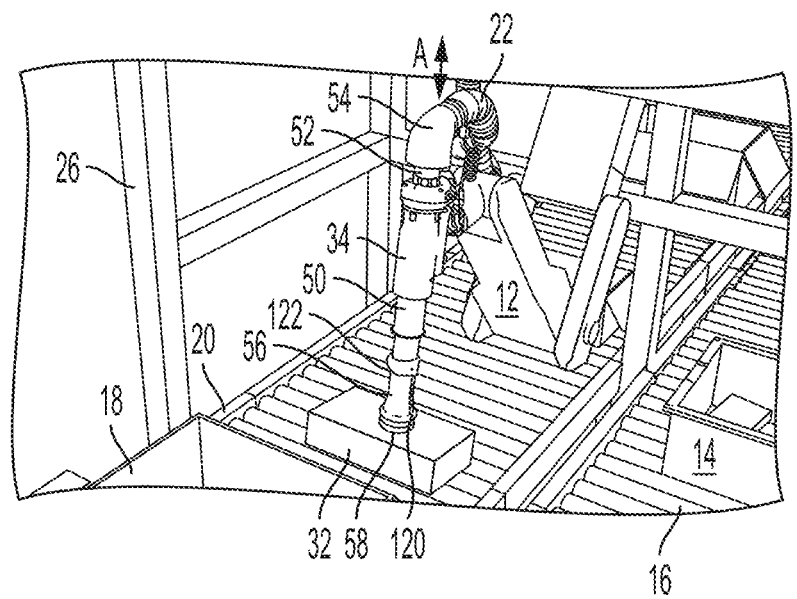

FIG. 2A shows the end-effector system 30 of the programmable motion device 12 grasping an object 32, and FIG. 2B shows the end-effector system 30 having rotated the object 32 about an axis that extends along an elongated direction A. The end-effector system 30 includes an arm attachment section 34 with a bracket 36 that attaches to a mounting plate section 38 of the programmable motion device 12 (as further shown in FIGS. 3A and 3B). Within the arm attachment section 34, and extending out from either opposing end of the arm attachment portion is a rotational spline shaft portion 50. The rotational spline shaft portion 50 is rotatable within and with respect to the arm attachment section 34 (about direction A) and is axially movable within and with respect to the arm attachment section 34 along the elongated direction A. The rotational spline shaft portion 50 extends in the elongated direction (A) and is coupled to a vacuum source 24 via a vacuum hose 22 through a vacuum hose connector 54 at a proximal end 52. The rotational spline shaft portion 50 includes a cup attachment portion 56 at a distal end thereof that is coupled to a vacuum cup 58. The arm attachment section 34 includes a rotation system 40 that includes a motor 42 coupled to a worm screw 44 that engages a spline gear 46 as shown in FIGS. 3A and 3B.

Figure 3A:
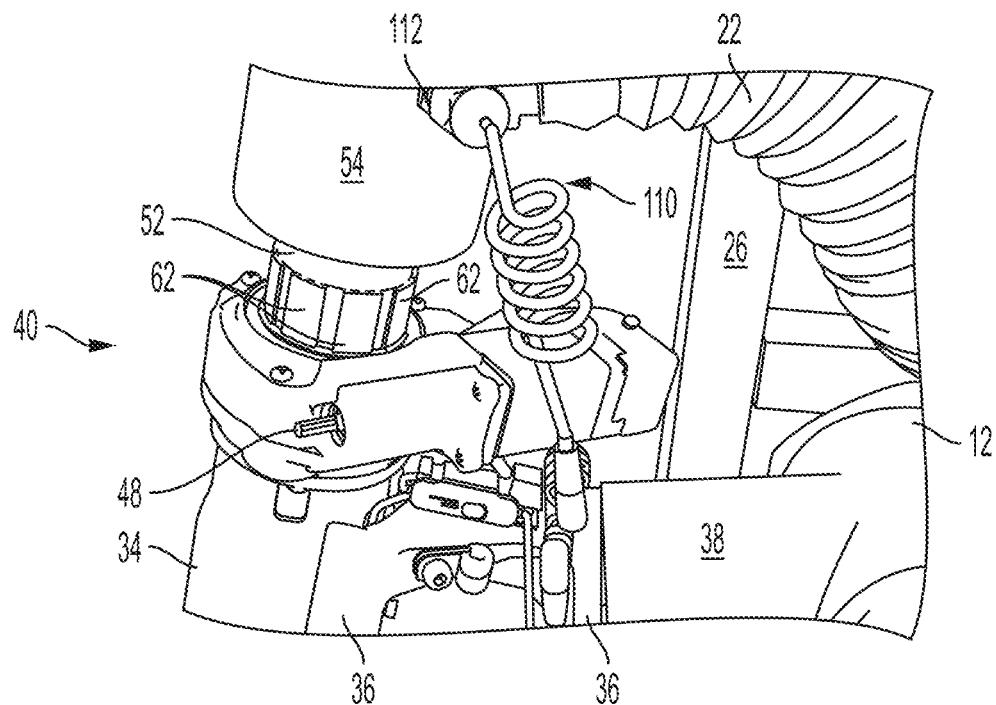
FIGS. 3A-3B show illustrative diagrammatic enlarged views of a portion of the end-effector system of FIG. 1 showing the rotation system with the housing cover on (FIG. 3A) and with the housing cover removed (FIG. 3B)
Figure 3B:
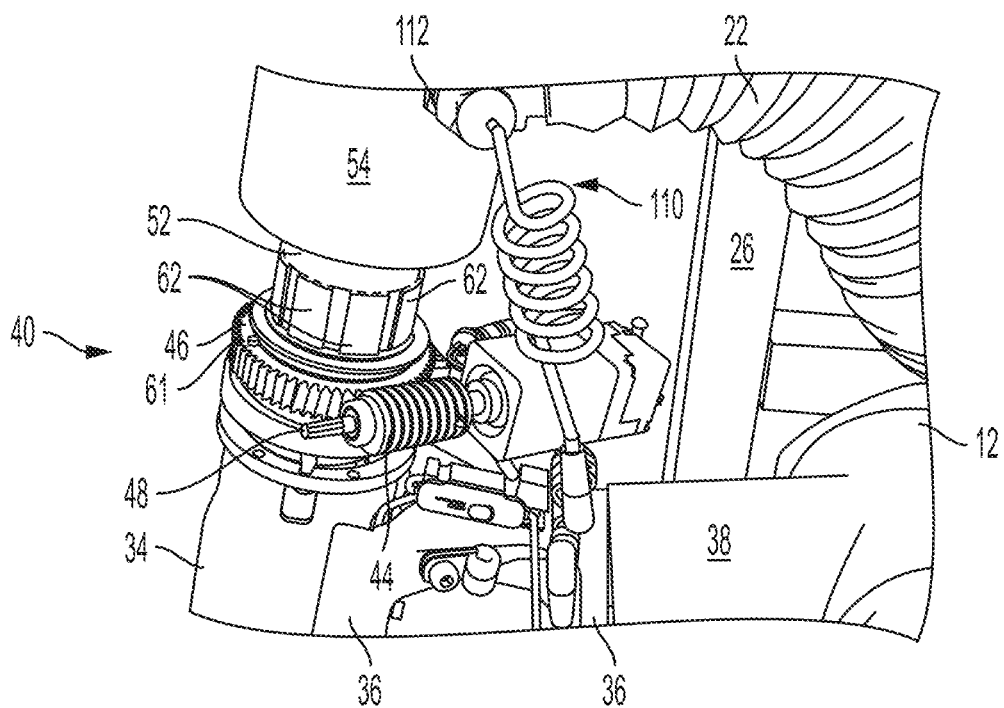

In particular, FIG. 3A shows the rotation system 40 with a housing covering the rotation system 40, and FIG. 3B shows a portion of the housing removed exposing the worm screw 44 and the spline gear 46. Threads on the worm screw 44 engage teeth 61 on the spline gear 46. As further shown in FIGS. 4A and 4B, the inner annular surface of the spline gear 46 includes drive splines 63 that engage shaft splines 62 on the rotational spline shaft portion 50. The spline gear 46 includes one or more stop elements 49 that contact a stop element 65 to limit the range of rotational movement of the spline gear, for example, to just short of 360 degrees (as shown in FIG. 5B) or 270 degrees (as shown in FIG. 19). The motor 42 and worm screw 44 are attached to the arm attachment portion 34, and the engage the spline gear 46. The spline gear 46 causes the rotational spline shaft portion 50 to rotate within the limited rotational range. The rotational spline shaft portion 50 extends through the elongated direction A of the arm attachment section 34 and is also movable along the elongated direction with respect to the arm attachment portion 34. A vacuum hose end 52 of the rotational spline shaft portion 50 (at the proximal end of the portion 50) is coupled to the vacuum hose connector 54, to which the vacuum hose 22 is connected.

A cup detection sensor system may include a first helical section 110 that attaches to the vacuum hose connector 54 at coupling 112 and accommodates axial movement of the vacuum hose connector 54 with respect to the arm attachment section 34. The cup detection sensor system may also include a second helical section 111 and a cup detection connector 113 that attaches to an inductive cup detection sensor 120 as further shown in FIGS. 6A and 6B. The second helical section 111 accommodates the limited range of rotational movement of the rotational spline shaft portion 50 with respect to the arm attachment section 34. In accordance with further aspects the sensor coupling 112 may also provide coupling to a pressure and/or vacuum flow sensor within the vacuum flow line in the vacuum hose connector 54. One or more air flow sensors or vacuum pressure sensors may therefore be provided within the vacuum flow line. In accordance with various aspects therefore, the system may, during movement of an object, detect the air flow and/or pressure within the vacuum flow line, adjust the yaw of the gripper. As the yaw of the gripper is adjusted, the sensor may detect an optimal yaw position at which to move an object during transit to a destination location based on any improvements in vacuum flow and/or vacuum pressure.

Figure 4A:
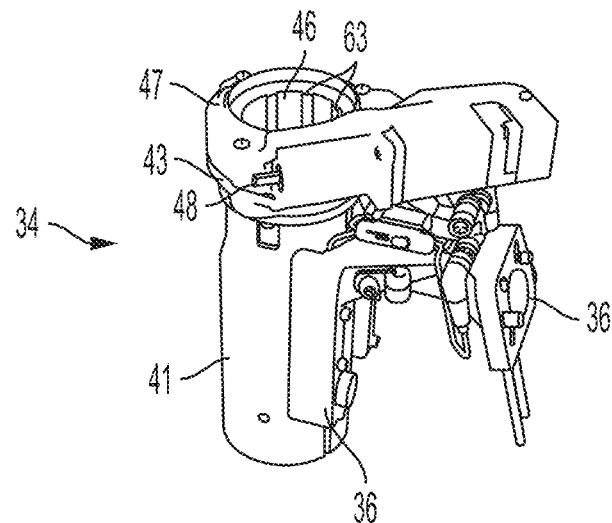
FIGS. 4A and 4B show illustrative diagrammatic views of the arm attachment section of the end-effector system of FIG. 1, showing the arm attachment section assembled (FIG. 4A) and in an exploded view (FIG. 4B)
Figure 4B:
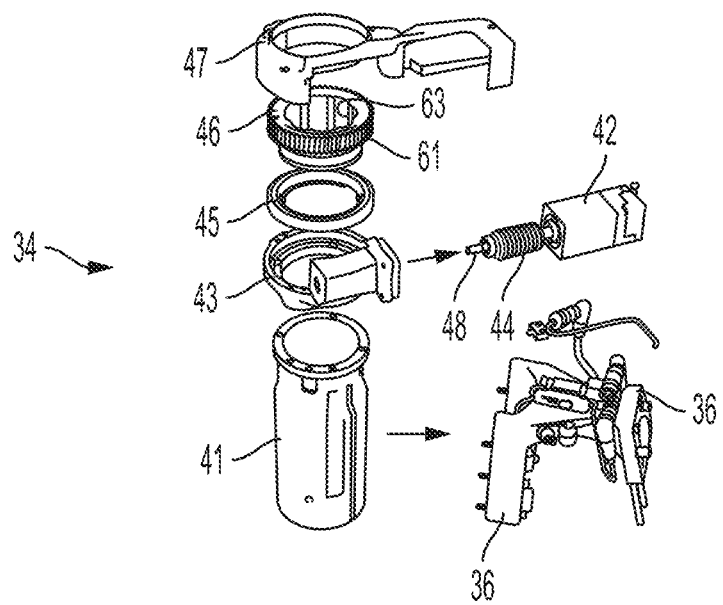
Figure 5A:
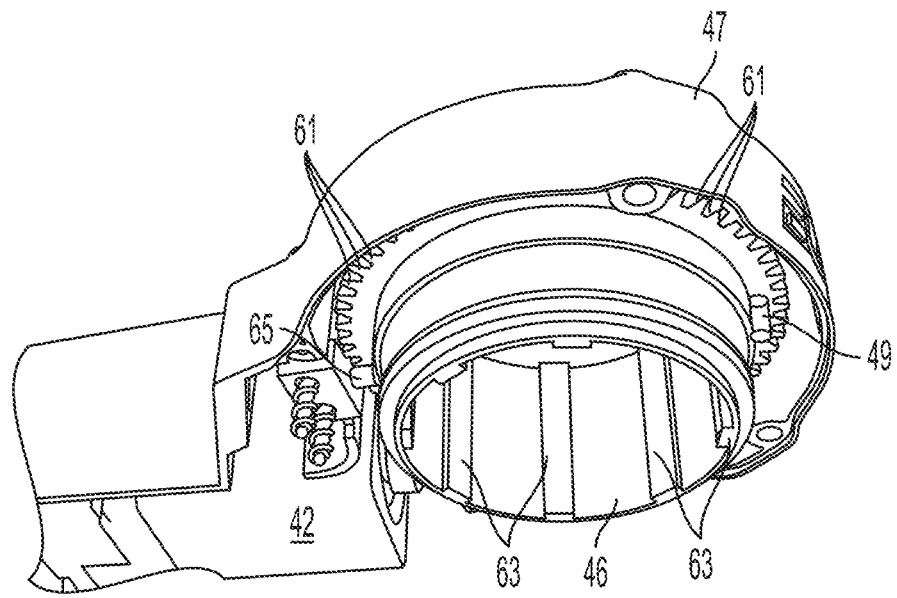
FIGS. 5A-5B show illustrative diagrammatic views of portions of the arm attachment section showing a lower elevational view of the spline gear system of the arm attachment section (FIG. 5A) and a bottom view of the spline gear system (FIG. 5B)
Figure 5B:
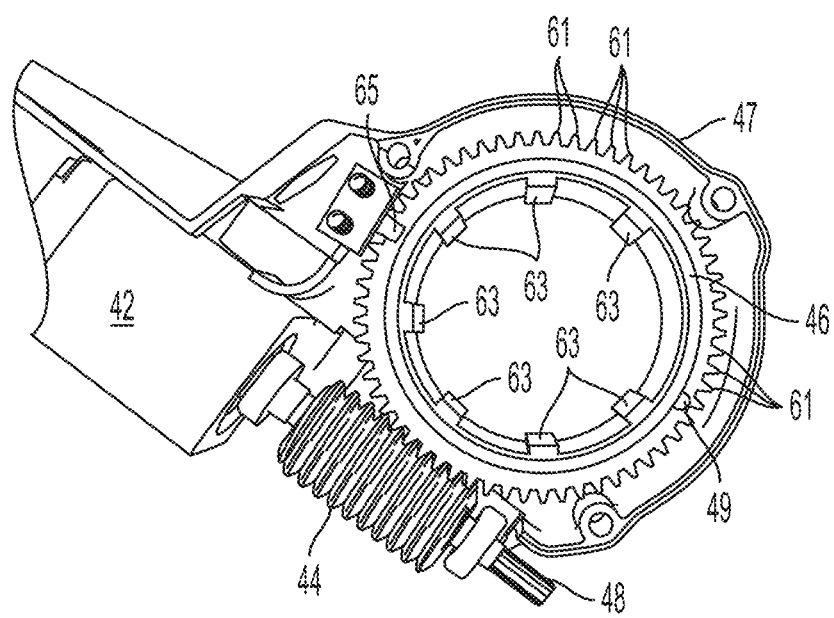

FIG. 4A shows the arm attachment portion 34 (without showing the rotational spline shaft portion 50), and FIG. 4B shows an exploded view of the arm attachment portion 34. The spline gear 46 is coupled to a rotation system seat 43 via a roller bearing set 45 that permits the spline gear to rotate with respect to the seat 43. The rotation system seat 43 sits on a base 41 to which the bracket 36 is attached, and a top cover 47 covers the otherwise exposed portion of the teeth 61 on the spline gear 46. FIG. 5A shows an underside isometric view of the spline gear 46 under the top cover 47, and FIG. 5B shows a bottom view of the elements shown in FIG. 5A. FIGS. 5A and 5B show the spline gear 46 with teeth 61 on the outer annular surface and drive splines 63 in the inner annular surface of the spline gear 46.

A fixed stop 65 limits the rotation of the spline gear (to about 355 degrees) by blocking a stop post 49 on the spline gear 46. The stop post 49 may be positioned slightly in-set into a core shaft of the spline gear 46 for additional support when contacting the fixed stop 65. As further shown in FIG. 5B, the shaft of the motor 42 may include an extension 48 with a knurled surface to permit human personnel to manually rotate the motor 42 shaft to manually cause rotation of the rotational spline shaft portion 50.

Figure 6A:
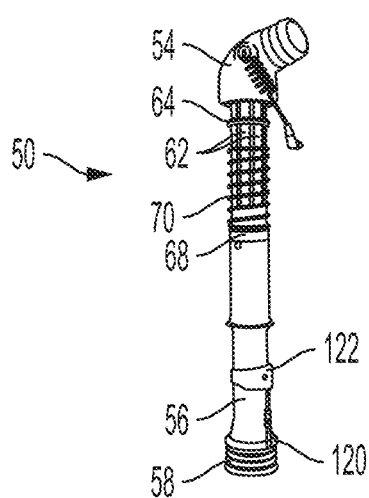
FIGS. 6A-6B show illustrative diagrammatic views of the rotational spline shaft portion of the end-effector system of FIG. 1, showing the rotational spline shaft portion assembled (FIG. 6A) and in an exploded view (FIG. 6B)
Figure 6B:
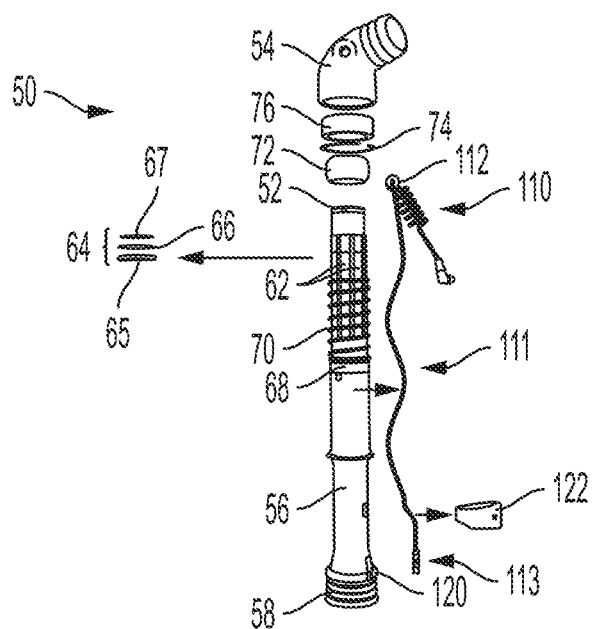
Figure 11A:
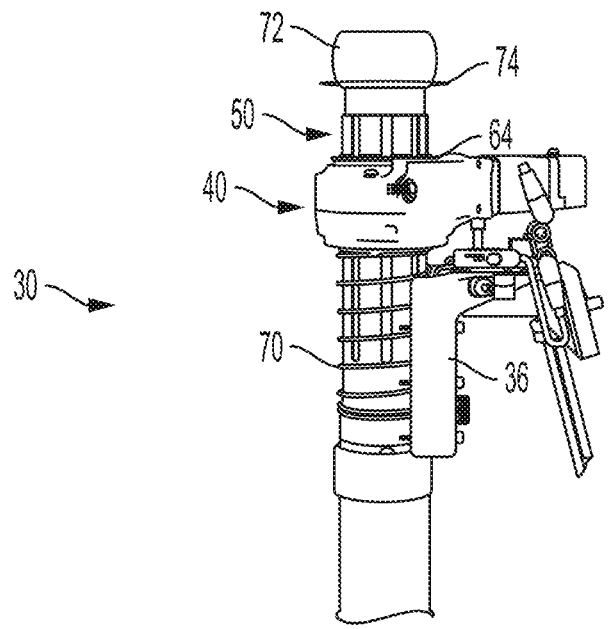
FIGS. 11A-11B show illustrative diagrammatic views of a portion of the end-effector system of FIG. 1 with the arm attachment section at rest with respect to the spline shaft portion (FIG. 11A) and with the arm attachment section having moved against the force of the spring shown in FIGS. 7 and 8 (FIG. 11B)
Figure 11B:
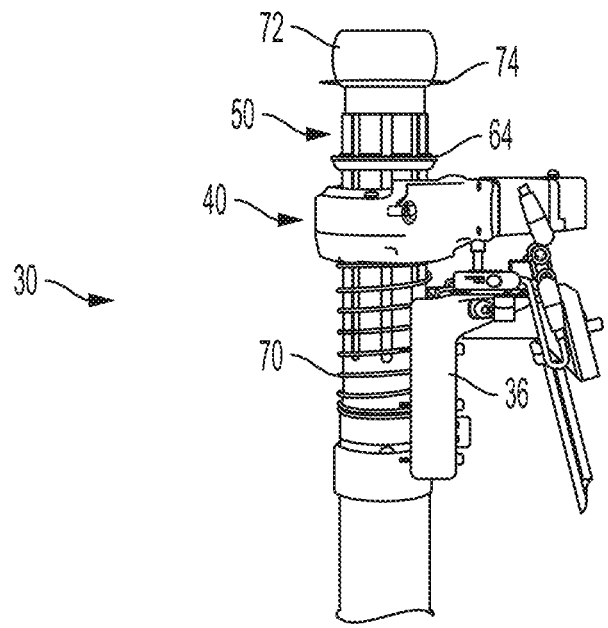

FIG. 6A shows the rotational spline shaft portion 50 (without showing the arm attachment portion 34), and FIG. 6B shows an exploded view of the rotational spline shaft portion 50. The proximal end 52 of the rotational spline shaft portion 50 is coupled via a ball-joint coupling to the vacuum hose connector 54, permitting relative rotation as well as yaw, pitch and roll of the rotational spline shaft portion 50 with respect to the vacuum hose connector 54. The ball-joint coupling includes an inner rounded annular member (ball) 72 that is attached to the rotational spline shaft portion 50 and sits within (and is movable relative) an outer annular member (socket) 76 that is attached to the vacuum hose connector 54. With further reference to FIG. 11B, a C-clip 74 may be used to engage an inner surface of the vacuum hose connector 54 to maintain the outer annular member 76 within the vacuum hose connector 54. A proximal end of the vacuum hose connector 54 includes a hose attachment section (also shown in FIG. 11A) for connecting to the vacuum hose 22.

As noted above, the cup detection sensor system includes first helical section 110 that sits outside of the rotational spline shaft portion 50 and accommodates axial movement of the rotational spline shaft portion 50 with respect to the arm attachment section 34, as well as the second helical section 111 that accommodates the limited range of rotational movement of the rotational spline shaft portion 50 with respect to the arm attachment second 34. An elastomeric band 122 provides a sealed passage of the wiring from the cup detection connector 113 outside the rotational spline shaft portion 50 to the second helical section 111 within the rotational spline shaft portion 50. The sensor coupling 112 provides a sealed passage of the wiring from within the rotational spline shaft portion 50 to the first helical section 110 outside of the rotational spline shaft portion 50. The cup detection system thereby provides for communication of cup detection signal information through a portion of the rotational spline shaft portion 50 (avoiding becoming ensnared in the environment), yet also permits rotational and axial movement of the portion 50 with respect to the arm attachment section 34 while maintaining a high flow vacuum within the rotational spline shaft portion 50.

Figure 7:
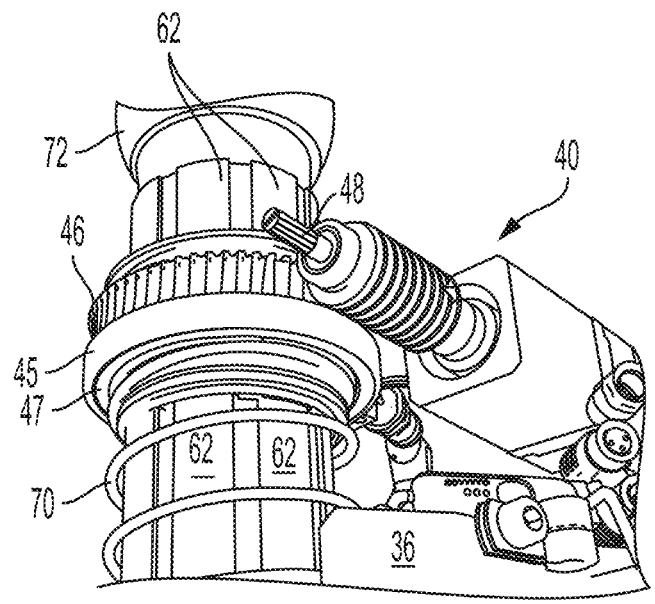
FIG. 7 shows an illustrative diagrammatic enlarged view of a portion of the end-effector system showing a spring secured against an underside of a roller bearing set at an upper end thereof.

The drive splines 63 of the spline gear 46 of the arm attachment section 34 may travel relative the shaft splines 62 of the rotational spline shaft portion 50, permitting the relative axial movement of the rotational spline shaft portion 50 with respect to the arm attachment section 34. This movement may be biased by a spring 70 that is fixed at a distal end on a shoulder 68 of the rotational spline shaft portion, and is urged at a proximal end to the underside 47 of roller bearing set 45 as shown in FIG. 7. FIG. 7 shows the rotation system 40 with a portion of the housing removed showing the spline gear 46 on the roller bearing set 45. A hard stop assembly 64 (shown in FIG. 6A) is provided by an O-ring gasket 65 that sits within an annular recess in the rotational spline shaft portion 50, and is held in position by a C-clip 67 that sits within an annular groove in the rotational spline shaft portion 50. A washer 66 between the two provides a larger stop surface for the O-ring gasket 65, and the O-ring gasket 65 provides a cushioned hard stop at a proximal end of the relative movement of the rotational spline shaft portion 50 and the arm attachment section 34.

Figure 8:
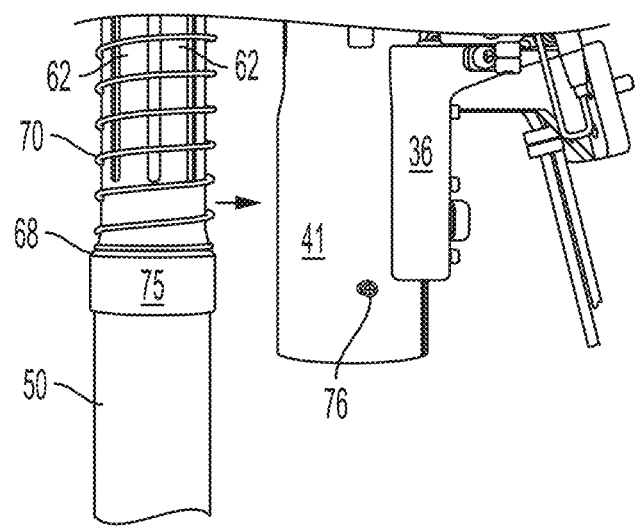
FIG. 8 shows an illustrative diagrammatic enlarged view of a portion of the end-effector system showing the spring secured against a shoulder of the spline shaft portion at a lower end thereof.

An annular magnet 68 is also provided on the rotational spline shaft portion 50, and a magnetic sensor 76 (shown in FIG. 8) is provided on the arm attachment section 34. FIG. 8 shows the base 41 of the arm attachment section 34 moved away from the rotational spline shaft portion 50 exposing the spring 70. Movement of the magnet 68 (attached to the rotational spline shaft portion 50) relative the sensor 76 (attached to the arm attachment section 34), provides relative axial position information regarding the relative position of the portion 50 and the section 34, permitting the operating system to know the relative position of the portion 50 and section 34 at all times. The distal end of the spring 70 is lodged against a distal shoulder 75 on the spline shaft portion 50.

The distal end of the rotational spline shaft portion 50 is coupled to the cup attachment portion 56 to which is attached to the vacuum cup 58. When the rotational spline shaft portion 50 rotates within the arm attachment portion 34, the cup attachment portion 56 and vacuum cup 58 rotate with the rotational spline shaft portion 50. Rotation of the spline gear 46 therefore directly causes rotation of the vacuum cup 58 as well as any object grasped by the vacuum cup 58. The cup detection system detects the presence of a vacuum cup 58 on the cup attachment portion 56, e.g., using the inductive sensor 120. The system 30 may also determine which specific sized cup is attached to the cup attachment portion 56 using for example, specific known arrangements of magnets for each vacuum cup or specific known lengths of push pins for each vacuum cup.

Figure 9:
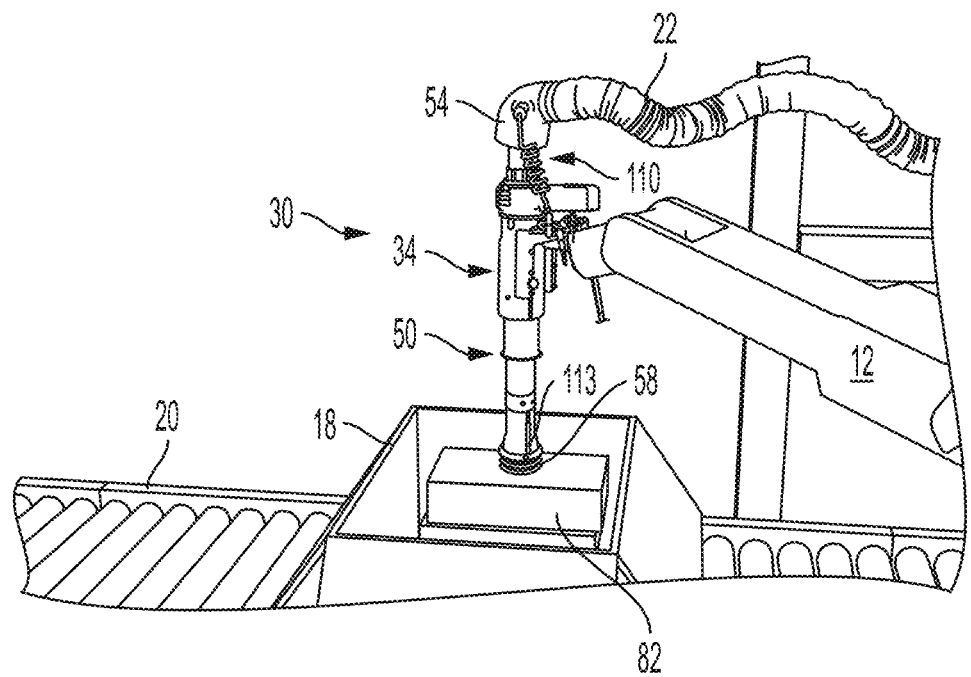
FIG. 9 shows an illustrative diagrammatic view of a portion of the object processing system of FIG. 1 in which the end-effector system is engaging an object.
Figure 10:
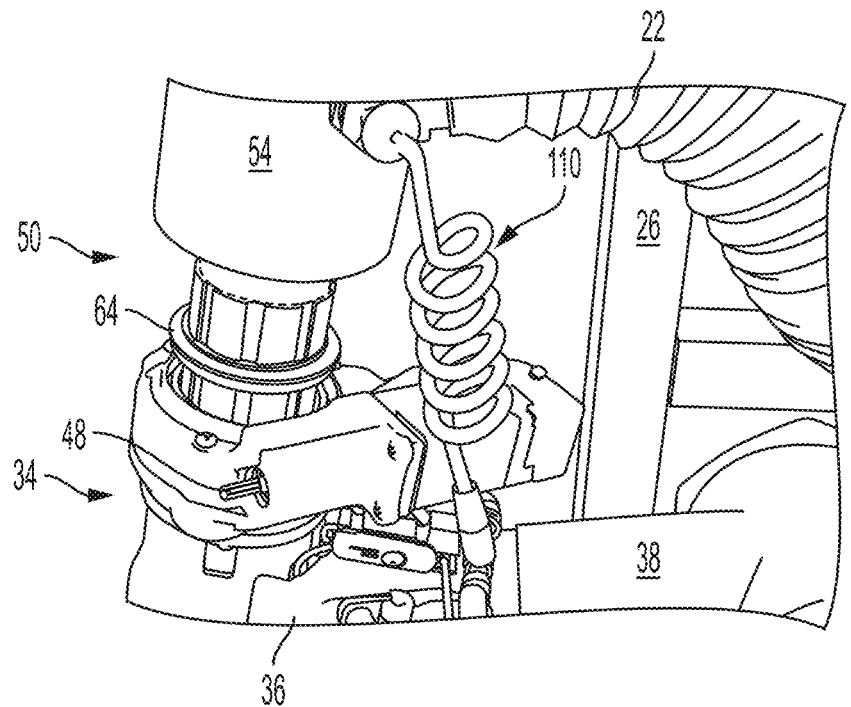
FIG. 10 shows an illustrative diagrammatic enlarged view of the rotation system of FIG. 3A with the arm attachment section having moved against the force of the spring shown in FIGS. 7 and 8.

FIG. 9 shows the end effector system 30 lowering an object 82 into a container 18, and as shown in the enlarged view of FIG. 10, the arm attachment portion 34 is permitted to move axially with respect to the rotational spline shaft portion 50 (against the spring 70). In particular, the end-effector system may approach an object (or move an object) along a direction that is parallel (e.g., coincident) with the axis of rotation of the end-effector system. Note that as shown in FIG. 10, the arm attachment section 34 is moved axially away from the stop assembly 64. Compare the relative positions of the arm attachment section and the spline shaft portion with that shown in FIG. 3A. In this way, axial forces on the end-effector system 30 are absorbed without adversely impacting automated processing activity. FIGS. 11A and 11B show the end-effector assembly 30 with the base 41 removed for clarity. In FIG. 11A, the spring 70 is urging the proximal portion of the arm attachment section 34 against the stop assembly 64, and in FIG. 11B, the arm assembly 34 is compressing the spring 70 permitting the proximal portion of the arm attachment section 34 to move distally from the stop assembly 64.

The ability of the end-effector system 30 to permit the arm attachment portion 34 to move along the axial direction of the rotational spline shaft portion 50, facilitates placement of objects without imparting contact forces on the articulated arm of the programmable motion device 12. Rotation, therefore of the rotational spline shaft portion 50 with respect to the arm attachment portion 34 is also not negatively impacted by the axial movement of the arm attachment portion 34 with respect to the rotational spline shaft portion 50. In fact, the rotation system 40 may cause rotation of the rotational spline shaft portion 50 during axial movement of the arm attachment portion 34 with respect to the rotational spline shaft portion 50. The rotation system and the spring biased axial movement response system are therefore independent of one another.

Through this use of the spring 70, the force acting against axial movement of the arm attachment portion 34 with respect to the rotational spline shaft portion 50 increases with distance of axial movement, and the arm attachment portion 34 returns to its original axial position with respect to the rotational spline shaft portion 50 when the end-effector system 30 is moved away from the object 72. When the force acting on the spring 70 is released, the relative position of the rotational spline shaft portion 50 and the arm attachment section 34 will return to a home position governed by the stop assembly 64 as shown in FIG. 11A. The at-spring-rest axial position of the rotational spline shaft portion 50 with respect to the arm attachment portion 34 however, may be further controlled through the use of one or more axial center-stop features.

Figure 12A:
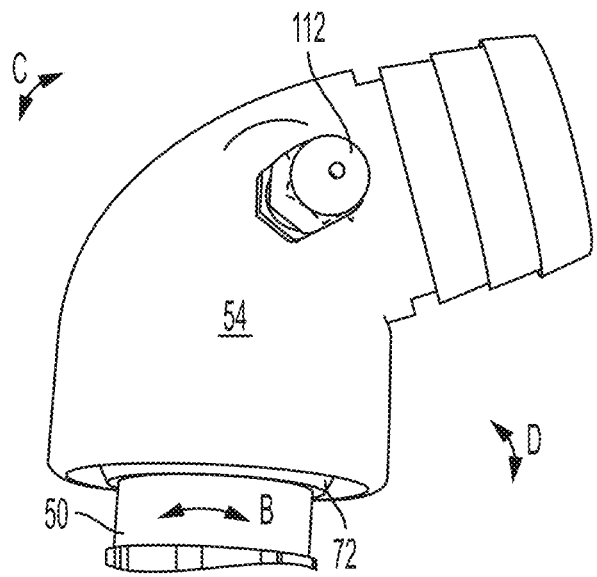
FIGS. 12A-12B show illustrative diagrammatic views of a coupling between the rotational spline shaft portion and a vacuum hose assembled (FIG. 12A) and exploded (FIG. 12B)
Figure 12B:
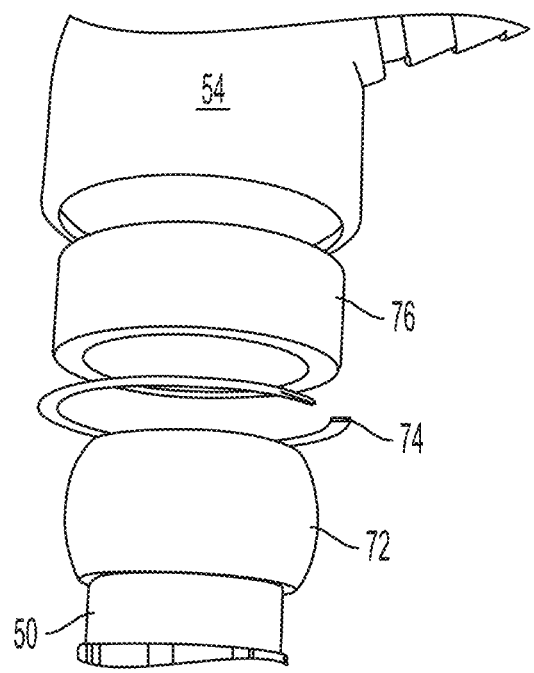

Because the rotational spline shaft portion 50 rotates, the coupling between the proximal end 52 of the rotational spline shaft portion 50 and the vacuum hose 22 must permit at least some rotation of the rotational spline shaft portion 50 with respect to the distal end of the vacuum hose 22. With reference to FIGS. 12A and 12B, this is achieved through use of the inner rounded annular member 72 on the rotational spline shaft portion 50 that is received within the outer annular member 76 within the vacuum hose connector 54 (and held in place within the vacuum hose connector by the C-clip 74). Not only does this dynamic coupling provide rotation (yaw) of the rotational spline shaft portion 50 with respect to the vacuum hose connector 54 (as generally shown at B in FIG. 12A) while maintaining high flow vacuum through the hose 22 to the vacuum cup 58, but the coupling also provides an open ball joint structure. This open ball joint structure permits pitch and roll of the rotational spline shaft portion 50 with respect to the vacuum hose connector 54 as generally shown at C and D in FIG. 12A, again, all while maintaining high flow vacuum through the hose 22 to the vacuum cup 58.

Figure 13:
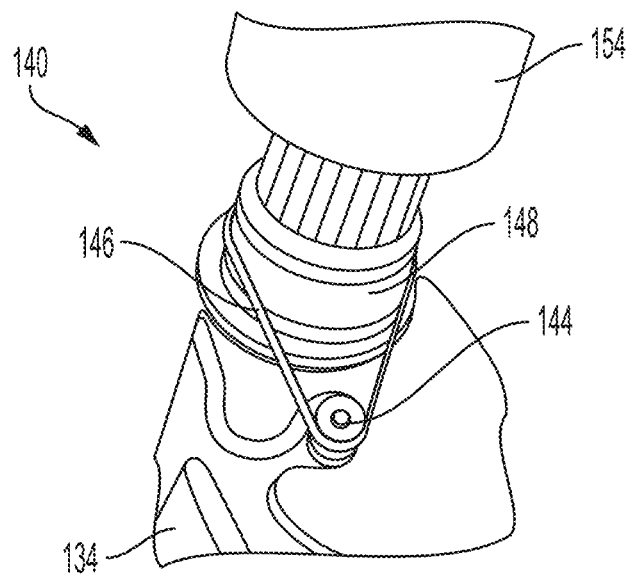
FIG. 13 shows an illustrative diagrammatic enlarged view of a portion of an end-effector system in accordance with another aspect of the invention that includes a belt-driven rotation system.
Figure 14:
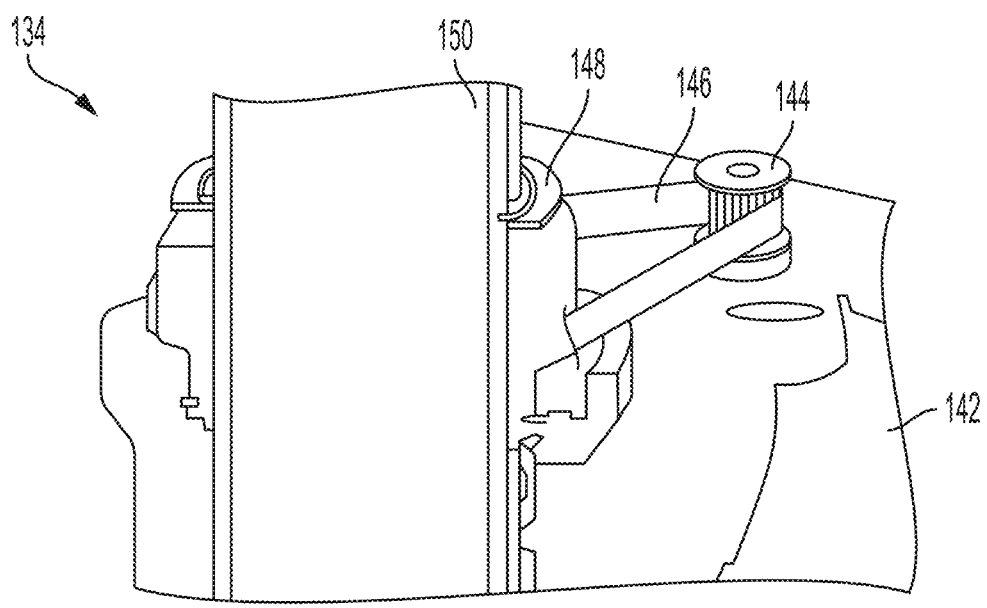
FIG. 14 shows an illustrative diagrammatic sectional view of a portion of the belt-driven rotational system of FIG. 13.
Figure 15:
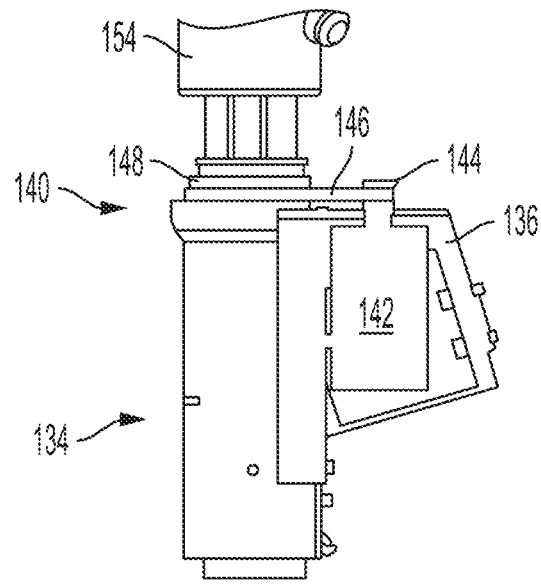
FIG. 15 shows an illustrative diagrammatic side view of a portion of the end-effector of FIG. 13 showing the belt-driven rotational system.

In accordance with various further aspects, the end-effector system may include a rotation system that uses a belt drive system. FIGS. 13-15, for example, show a rotation system 140 that includes a stepper or servo motor 142 with an output drive gear 144 that drives a belt 146 for rotating a shaft rotating gear 148 of a rotational spline shaft portion 150 of an end-effector system. FIG. 13 shows an upper elevational view of the belt drive system. FIG. 14 shows a side sectional view through the spline shaft portion, and FIG. 15 shows a side view of the belt drive system showing the rotational spline shaft portion. The rotational spline shaft portion 150 may be provided for rotation (and axial movement along splines) within an arm attachment portion 134. The motor 142 may be provided within a bracket 136 that secures the arm attachment portion 134 to the programmable motion device.

Figure 16:
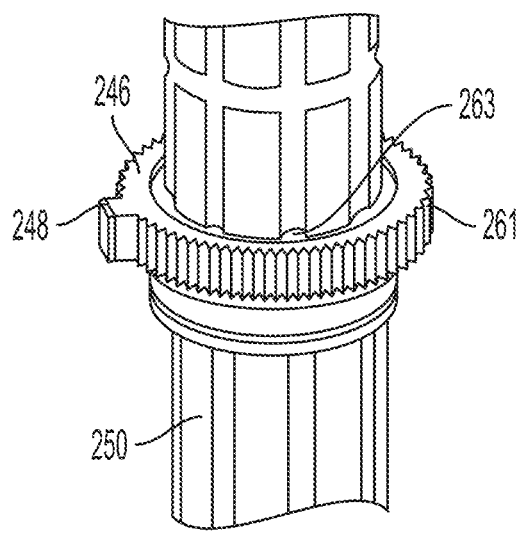
FIG. 16 shows an illustrative diagrammatic view of a spline shaft and a spline gear in accordance with another aspect of the invention wherein the spline gear includes an integral stop element.

FIGS. 16-20 show various further aspects of an end-effector system that includes a spline gear drive system with a more limited range of rotational movement. In particular, FIG. 16 shows a spline gear 246 with teeth 261 on an outer annular surface thereof, and drive splines 263 on an inner annular surface thereof. The spline gear 246 is mounted on a rotational spline shaft portion that includes 262 shaft splines.

Figure 17:
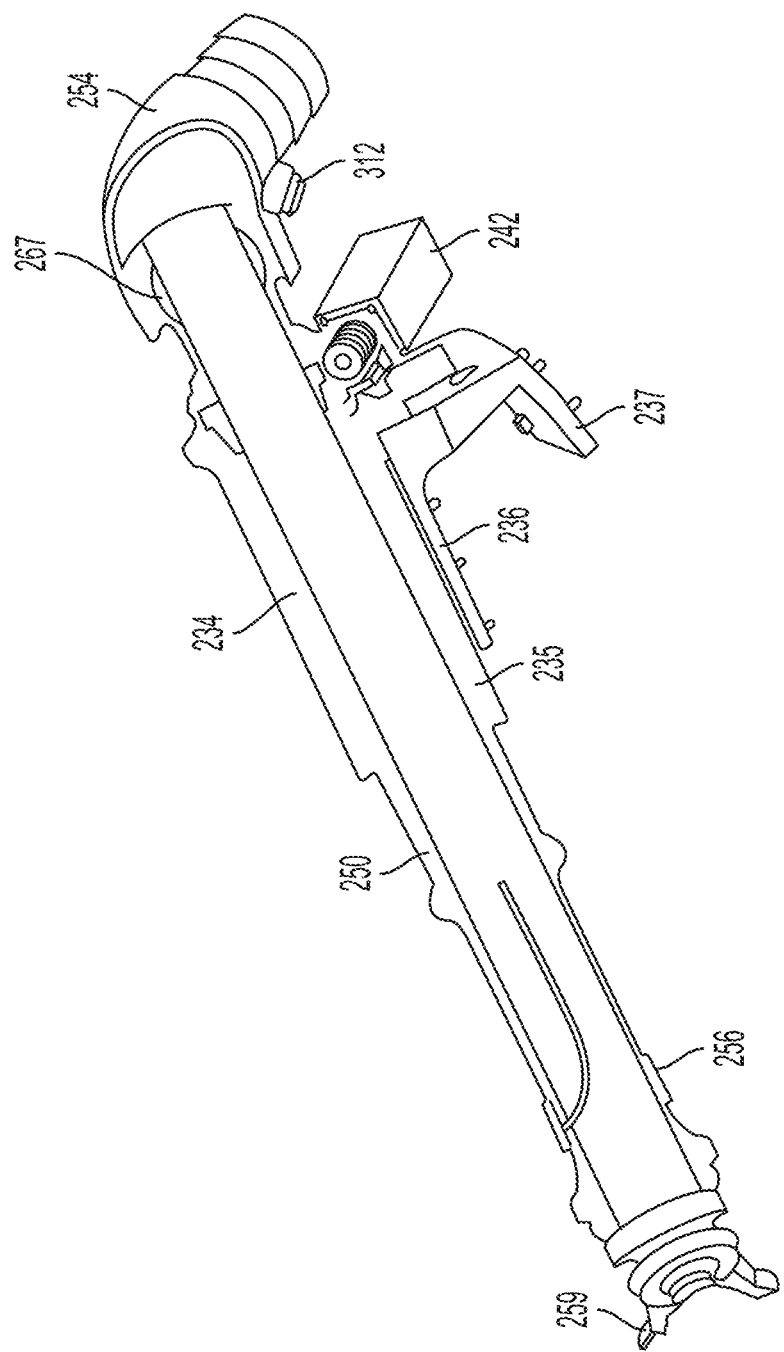
FIG. 17 shows an illustrative diagrammatic view of an end-effector system including the spline gear of FIG. 16.

FIG. 17 shows an elongated sectional view of an end-effector system of an aspect that includes vacuum cup 259, cup attachment portion 256, rotational spline shaft portion 250, arm attachment portion 234, bracket 236, rounded annular hose coupling 267 and vacuum hose connector 254. The central region of the rotational spline shaft portion is hollow to permit the passage of the vacuum to the distal end of the end-effector system.

Figure 18A:
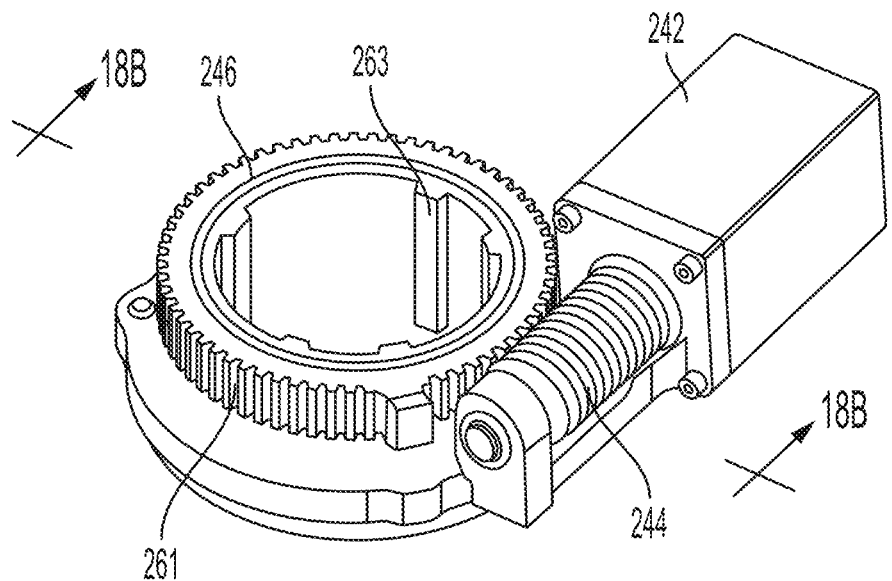
FIGS. 18A and 18B show illustrative diagrammatic views of the spline gear of FIG. 16 engaged with a rotation system (FIG. 18A) and showing a sectional view of the system of FIG. 18A taken along line 18B-18B thereof (FIG. 18B)
Figure 18B:
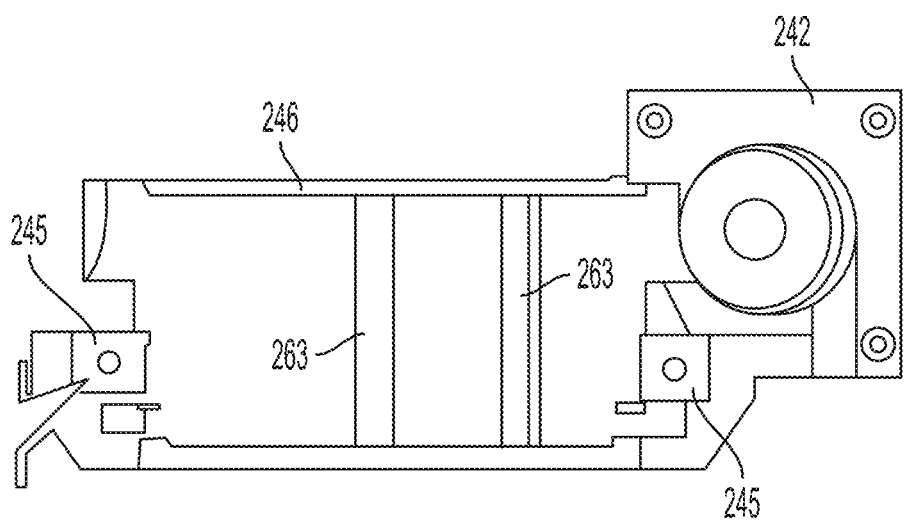

FIGS. 18A and 18B show side elevational and side sectional views of the rotation system 240. The system 240 includes the motor 242 (e.g., a stepper motor or a servo motor), worm screw 244, and spline gear 246 as shown in FIG. 18A. The side elevational view of the rotation system 240 further shows the teeth 261 on the outer annular surface of the spline gear 246, and the side sectional view further shows the ball bearing set 245 that carries the radial and thrust loads of the rotational spline shaft portion 250b as shown in FIG. 18B.

Figure 20:
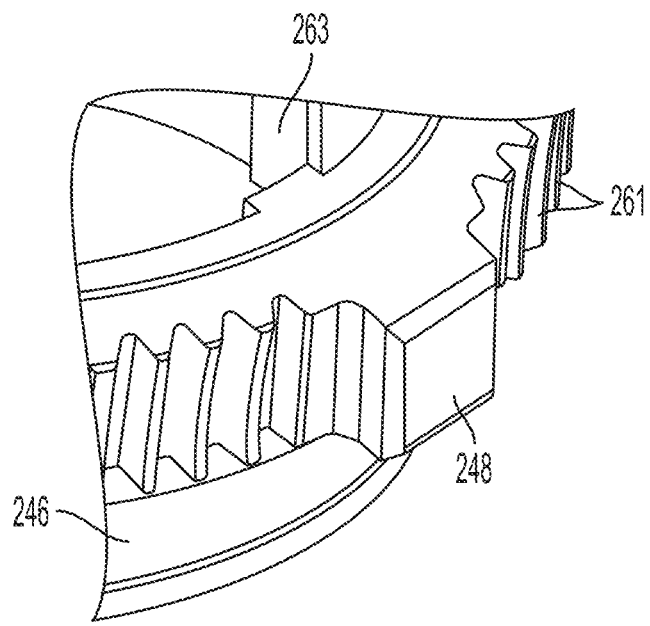
FIG. 20 shows an illustrative diagrammatic enlarged view of a portion of the spline gear of FIG. 16 showing the integral stop element.
Figure 21:
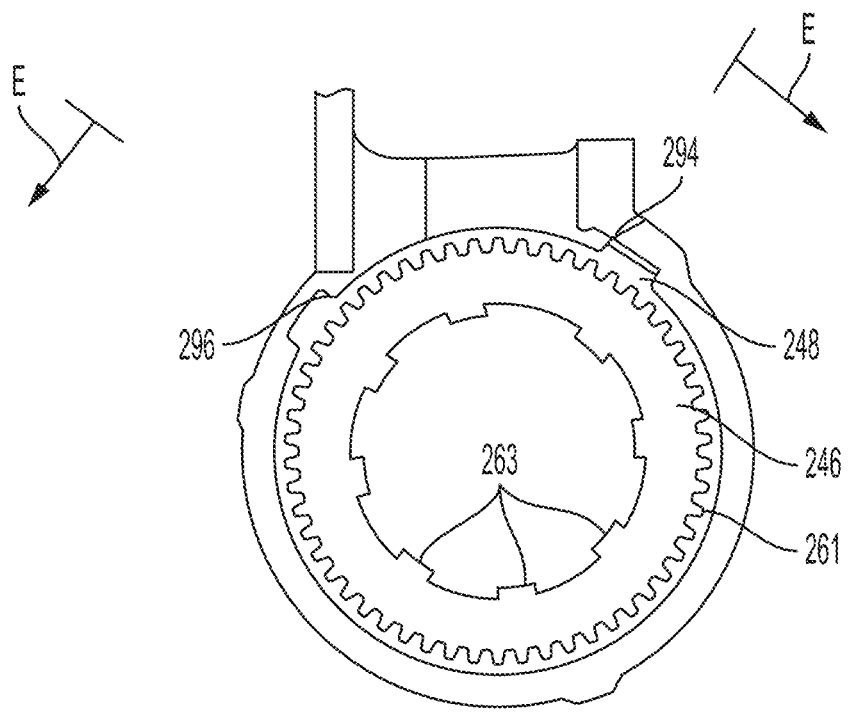
FIG. 21 shows a top view of the spline gear of FIG. 16 within a portion of an attachment portion.

FIG. 19 shows an exploded view of the rotation system 240, showing the ball bearing set 245 with a rotation system seat 243, as well as the attachment mechanism for the motor 242, worm screw 244 and spline gear 246. FIG. 20 shows an enlarged view of the stop element 248 that limits the rotational range of the spline gear 246 as rotated by the worm screw by providing a hard-stop at each end of the limited rotational range (e.g., at 294, 296 shown in FIG. 21). In particular, and with further reference to FIG. 21, the limited rotational range is defined by a first hard-stop shoulder 294 and a second hard-stop shoulder 296, that between them define the limited rotational range as shown at E. This limited rotational range may be for example, between about 90° and about 350°, between about 180° and about 320°, or between about 225° and about 315°, e.g., about 270°.

A centering feature (such as radial rotation alignment feature) may be positioned at a center of the limited rotational range. In other applications, one of the hard-stop shoulders (e.g., 294) may be used as a rotational home position. If the motor 240 (and 40 above) is a servo motor, a closed loop control system may be used to provide robust torque control allowing hard-stop contact at full speed and/or power. If the motor 240 (and 40 above) is an integrated stepper motor, the motor may similarly be robust, also allowing hard-stop contact at full speed and/or power, for example, by monitoring forward and backward stepper increments.

Figure 22:
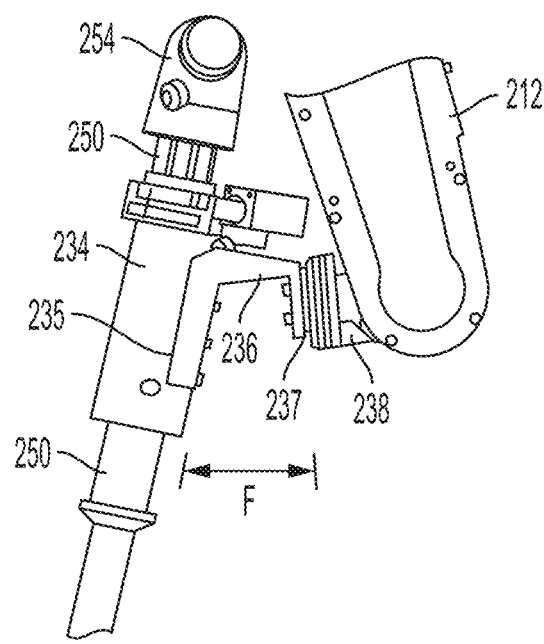
FIG. 22 shows a portion of the end-effector system of FIG. 17 showing the arm attachment portion coupled to an articulated arm of a programmable motion device.

FIG. 22 shows a side view of the arm attachment portion 234 of the end-effector system 230, with the bracket 236 attached to the mounting plate section 238 of the programmable motion device 212. The bracket may extend (from the arm attachment portion 234 to the mounting plate section 238) a distance that accommodates the motor 242 of the rotation system 240, by keeping the motor 242 a sufficient clearance distance from the programmable motion device 212 even when an articulated arm section adjacent the mounting plate section 238 is moved toward the end-effector system 230 as shown in FIG. 22. Additionally, the opposing mounting surfaces of the bracket 236 (as shown at 235 and 237) may be non-parallel and may be provided at angle of about 80° as shown at/', which facilitates grasping objects while minimizing forces on the vacuum hose connector 54.

Figure 23A:
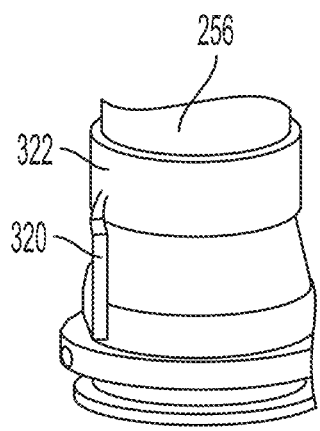
FIGS. 23A and 23B show illustrative diagrammatic enlarged views of distal portions of the end-effector system of FIG. 17 showing a cup detection sensor mounting (FIG. 23A) and showing a partially cut-away view of the cup detection sensor mounting (FIG. 23B)
Figure 23B:
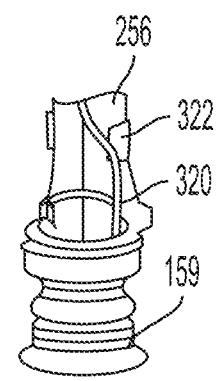

FIGS. 23A and 23B show enlarged views of the cup attachment portion 256 and cup detection sensor 320 with a different cup 259 attached to the cup attachment portion 156. The wiring for cup detection sensor 320 enters the portion 156 through an elastomer band 322 and may enter under the elastomeric band 322 (as shown in FIG. 23A) and exit through a sensor coupling in the vacuum hose connector (as shown in FIG. 23B).

Figure 24A:
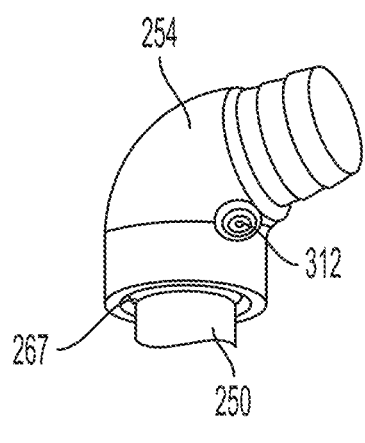
FIGS. 24A and 24B show illustrative diagrammatic views of a coupling between the rotational spline shaft portion and a vacuum hose assembled (FIG. 24A) and partially cut-away (FIG. 24B) of the end-effector system of FIG. 17.
Figure 24B:
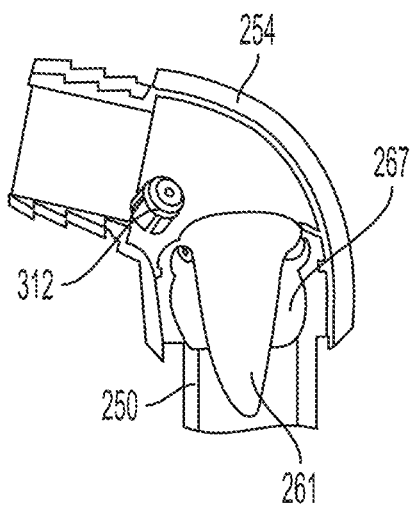
Figure 25:
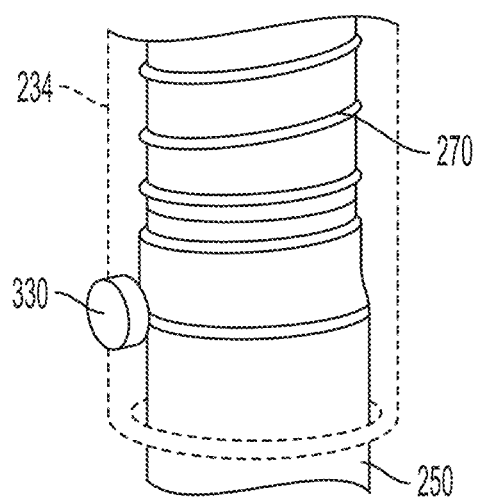
FIG. 25 shows an illustrative diagrammatic view of a portion of the end-effector of FIG. 17 showing a calibration lock.

FIGS. 24A and 24B show the rotational spline shaft portion 250 and vacuum hose connector 254 coupled with a further rounded annular hose coupling 267 and rounded annular shaft coupling 261 in accordance with further aspects of the invention. FIG. 24A shows a side view and FIG. 24B shows a partial sectional view showing the couplings 261, 267. The couplings 261, 267 permit rotation, as well as pitch and roll of the rotational spline shaft portion 250 with respect to the vacuum hose connector 254 as discussed above. With reference to FIG. 25, a calibration lock 330 may be used to lock the inner tube (section 56) during calibration. The yaw of the gripper may be set to a home position for this calibration.

Those skilled in the art will appreciate that numerous modifications and variations may be made to the above disclosed embodiments without departing from the spirit and scope of the present invention.

What is claimed is:

1. An end-effector system for use with a programmable motion device, said end-effector system comprising:
    an arm attachment portion for attachment to an arm of the programmable motion device, said arm attachment portion extending in an axial direction and including a spline gear with inwardly facing drive splines;
    an end-effector attachment portion for attachment to an end-effector for grasping objects; and
    a spline shaft received by the arm attachment portion, said spline shaft being coupled to the end-effector attachment portion at a distal end thereof, and including shaft splines that engage the drive splines of the spline gear to permit movement of the spline shaft with respect to the arm attachment portion in the axial direction;
    wherein the spline shaft includes a vacuum hose connector at a proximal end of the spline shaft that is opposite the distal end, the vacuum hose connector being adapted to engage a vacuum hose terminus at a distal end of a vacuum hose.

2. The end-effector system as claimed in claim 1, wherein the movement of the spline shaft with respect to the arm attachment portion in the axial direction is spring biased.

3. The end-effector system as claimed in claim 1, wherein the end-effector system includes a cup detection sensor system that includes a helical wiring portion that accommodates movement of the rotational shaft portion with respect to the arm attachment portion.

4. The end-effector system as claimed in claim 1 further comprising a stop assembly to limit a range of motion of the spline shaft in the axial direction.

5. The end-effector system as claimed in claim 1, wherein the spline gear and spline shaft have a rotational home position.

6. The end-effector system as claimed in claim 1, wherein the arm attachment portion further includes a motor and a worm screw that engages the spline gear to cause the spline shaft to rotate with respect to the arm attachment portion.

7. The end-effector system as claimed in claim 6, wherein the motor includes an exposed portion of a motor shaft that is adapted for manual rotation of the motor shaft.

8. The end-effector system as claimed in claim 1, wherein the vacuum hose connector includes an annular shaft coupling that engages a rounded annular hose coupling with the vacuum hose connector.

9. The end-effector system as claimed in claim 8, wherein the annular shaft coupling and the rounded annular hose coupling permits movement of the spline shaft with respect to the vacuum hose terminus in at least two degrees of freedom.

10. An end-effector system for use with a programmable motion device, said end-effector system comprising:
    an arm attachment portion for attachment to an arm of the programmable motion device, said arm attachment portion extending in an axial direction and including a spline gear with inwardly facing drive splines;
    an end-effector attachment portion for attachment to an end-effector for grasping objects; and
    a spline shaft received by the arm attachment portion, said spline shaft being coupled to the end-effector attachment portion at a distal end thereof, and including shaft splines that engage the drive splines of the spline gear to permit movement of the spline shaft with respect to the arm attachment portion in the axial direction;
    wherein the movement of the spline shaft with respect to the arm attachment portion in the axial direction is spring biased.

11. The end-effector system as claimed in claim 10, wherein the end-effector system includes a cup detection sensor system that includes a helical wiring portion that accommodates movement of the rotational shaft portion with respect to the arm attachment portion.

12. The end-effector system as claimed in claim 10, further comprising a stop assembly to limit a range of motion of the spline shaft in the axial direction.

13. The end-effector system as claimed in claim 10, wherein the spline gear and spline shaft have a rotational home position.

14. The end-effector system as claimed in claim 10, wherein the arm attachment portion further includes a motor and a worm screw that engages the spline gear to cause the spline shaft to rotate with respect to the arm attachment portion.

15. The end-effector system as claimed in claim 14, wherein the motor includes an exposed portion of a motor shaft that is adapted for manual rotation of the motor shaft.

16. The end-effector system as claimed in claim 10, wherein the spline shaft includes a vacuum hose connector at a proximal end of the spline shaft that is opposite the distal end, the vacuum hose connector being adapted to engage a vacuum hose terminus at a distal end of a vacuum hose and the vacuum hose connector includes an annular shaft coupling that engages a rounded annular hose coupling with the vacuum hose connector.

17. The end-effector system as claimed in claim 16, wherein the annular shaft coupling and the rounded annular hose coupling permits movement of the spline shaft with respect to the vacuum hose terminus in at least two degrees of freedom.

18. An end-effector system for use with a programmable motion device, said end-effector system comprising:

an arm attachment portion for attachment to an arm of the programmable motion device, said arm attachment portion extending in an axial direction and including a spline gear with inwardly facing drive splines;

an end-effector attachment portion for attachment to an end-effector for grasping objects; and a spline shaft received by the arm attachment portion, said spline shaft being coupled to the end-effector attachment portion at a distal end thereof, and including shaft splines that engage the drive splines of the spline gear to permit movement of the spline shaft with respect to the arm attachment portion in the axial direction;

wherein the arm attachment portion further includes a motor and a worm screw that engages the spline gear to cause the spline shaft to rotate with respect to the arm attachment portion.

19. The end-effector system as claimed in claim 18, wherein the motor includes an exposed portion of a motor shaft that is adapted for manual rotation of the motor shaft.

20. The end-effector system as claimed in claim 18, wherein the end-effector system includes a cup detection sensor system that includes a helical wiring portion that accommodates movement of the rotational shaft portion with respect to the arm attachment portion.

21. The end-effector system as claimed in claim 18, further comprising a stop assembly to limit a range of motion of the spline shaft in the axial direction.

22. The end-effector system as claimed in claim 18, wherein the spline gear and spline shaft have a rotational home position.

23. The end-effector system as claimed in claim 18, wherein the spline shaft includes a vacuum hose connector at a proximal end of the spline shaft that is opposite the distal end, the vacuum hose connector being adapted to engage a vacuum hose terminus at a distal end of a vacuum hose, and wherein the vacuum hose connector includes an annular shaft coupling that engages a rounded annular hose coupling with the vacuum hose connector.

24. The end-effector system as claimed in claim 23, wherein the annular shaft coupling and the rounded annular hose coupling permits movement of the spline shaft with respect to the vacuum hose terminus in at least two degrees of freedom.

25. An end-effector system for use with a programmable motion device, said end-effector system comprising:

an arm attachment portion for attachment to an arm of the programmable motion device, said arm attachment portion extending in an axial direction and including a spline gear with inwardly facing drive splines;

an end-effector attachment portion for attachment to an end-effector for grasping objects; and a spline shaft received by the arm attachment portion, said spline shaft being coupled to the end-effector attachment portion at a distal end thereof, and including shaft splines that engage the drive splines of the spline gear to permit movement of the spline shaft with respect to the arm attachment portion in the axial direction;

wherein the end-effector system includes a cup detection sensor system that includes a helical wiring portion that accommodates movement of the rotational shaft portion with respect to the arm attachment portion.

26. The end-effector system as claimed in claim 25, wherein the arm attachment portion further includes a motor and a worm screw that engages the spline gear to cause the spline shaft to rotate with respect to the arm attachment portion, and wherein the motor includes an exposed portion of a motor shaft that is adapted for manual rotation of the motor shaft.

27. The end-effector system as claimed in claim 25, further comprising a stop assembly to limit a range of motion of the spline shaft in the axial direction.

28. The end-effector system as claimed in claim 25, wherein the spline gear and spline shaft have a rotational home position.

29. The end-effector system as claimed in claim 25, wherein the spline shaft includes a vacuum hose connector at a proximal end of the spline shaft that is opposite the distal end, the vacuum hose connector being adapted to engage a vacuum hose terminus at a distal end of a vacuum hose, and wherein the vacuum hose connector includes an annular shaft coupling that engages a rounded annular hose coupling with the vacuum hose connector.

30. The end-effector system as claimed in claim 29, wherein the annular shaft coupling and the rounded annular hose coupling permits movement of the spline shaft with respect to the vacuum hose terminus in at least two degrees of freedom.

31. An end-effector system for use with a programmable motion device, said end-effector system comprising:

an arm attachment portion for attachment to an arm of the programmable motion device, said arm attachment portion extending in an axial direction and including a spline gear with inwardly facing drive splines;

an end-effector attachment portion for attachment to an end-effector for grasping objects;

a spline shaft received by the arm attachment portion, said spline shaft being coupled to the end-effector attachment portion at a distal end thereof, and including shaft splines that engage the drive splines of the spline gear to permit movement of the spline shaft with respect to the arm attachment portion in the axial direction; and a stop assembly to limit a range of motion of the spline shaft in the axial direction.

32. The end-effector system as claimed in claim 31, wherein the arm attachment portion further includes a motor and a worm screw that engages the spline gear to cause the spline shaft to rotate with respect to the arm attachment portion, and wherein the motor includes an exposed portion of a motor shaft that is adapted for manual rotation of the motor shaft.

33. The end-effector system as claimed in claim 31, wherein the spline gear and spline shaft have a rotational home position.

34. The end-effector system as claimed in claim 31, wherein the spline shaft includes a vacuum hose connector at a proximal end of the spline shaft that is opposite the distal end, the vacuum hose connector being adapted to engage a vacuum hose terminus at a distal end of a vacuum hose and the vacuum hose connector includes an annular shaft coupling that engages a rounded annular hose coupling with the vacuum hose connector.

35. The end-effector system as claimed in claim 34, wherein the annular shaft coupling and the rounded annular hose coupling permits movement of the spline shaft with respect to the vacuum hose terminus in at least two degrees of freedom.

* * * * *